(12) United States Patent
Allain et al.

(10) Patent No.: US 10,308,995 B2
(45) Date of Patent: Jun. 4, 2019

(54) STEEL SHEET HAVING VERY HIGH MECHANICAL PROPERTIES OF STRENGTH AND DUCTILITY

(71) Applicant: ArcelorMittal, Luxembourg (LU)

(72) Inventors: Sebastien Allain, Pont A Mousson (FR); Jean-Christophe Hell, Metz (FR)

(73) Assignee: ARCELORMITTAL, Luxembourg (LU)

( * ) Notice: Subject to any disclaimer, the term of this patent is extended or adjusted under 35 U.S.C. 154(b) by 194 days.

(21) Appl. No.: 14/907,358

(22) PCT Filed: Jul. 24, 2014

(86) PCT No.: PCT/IB2014/001389
§ 371 (c)(1),
(2) Date: Jan. 25, 2016

(87) PCT Pub. No.: WO2015/011554
PCT Pub. Date: Jan. 29, 2015

(65) Prior Publication Data
US 2016/0160309 A1    Jun. 9, 2016

(30) Foreign Application Priority Data

Jul. 24, 2013 (WO) .................. PCT/IB2013/001614

(51) Int. Cl.
| | | |
|---|---|---|
| *C22C 38/04* | (2006.01) | |
| *C22C 38/02* | (2006.01) | |
| *C22C 38/12* | (2006.01) | |
| *C22C 38/14* | (2006.01) | |
| *C22C 38/18* | (2006.01) | |
| *C22C 38/34* | (2006.01) | |
| *C22C 38/38* | (2006.01) | |
| *C21D 9/46* | (2006.01) | |
| *C23C 2/02* | (2006.01) | |
| *C23C 2/06* | (2006.01) | |
| *C23C 2/12* | (2006.01) | |
| *C23C 2/28* | (2006.01) | |
| *C23C 2/40* | (2006.01) | |
| *B22D 7/00* | (2006.01) | |
| *C21D 1/26* | (2006.01) | |
| *C21D 6/00* | (2006.01) | |
| *C21D 8/02* | (2006.01) | |
| *C22C 38/00* | (2006.01) | |
| *C22C 38/06* | (2006.01) | |
| *C22C 38/42* | (2006.01) | |
| *C22C 38/44* | (2006.01) | |
| *C22C 38/46* | (2006.01) | |
| *C22C 38/48* | (2006.01) | |
| *C22C 38/50* | (2006.01) | |

(Continued)

(52) U.S. Cl.
CPC ................ *C21D 9/46* (2013.01); *B22D 7/00* (2013.01); *B32B 15/013* (2013.01); *C21D 1/26* (2013.01); *C21D 6/004* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0263* (2013.01); *C22C 38/001* (2013.01); *C22C 38/002* (2013.01); *C22C 38/02* (2013.01); *C22C 38/04* (2013.01); *C22C 38/06* (2013.01); *C22C 38/34* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01); *C23C 2/02* (2013.01); *C23C 2/06* (2013.01); *C23C 2/12* (2013.01); *C23C 2/28* (2013.01); *C23C 2/40* (2013.01)

(58) Field of Classification Search
None
See application file for complete search history.

(56) References Cited

U.S. PATENT DOCUMENTS 8,480,819 B2 * 7/2013 Futamura .............. B32B 15/013
148/320
8,876,987 B2  11/2014 Matsuda et al.
(Continued)

FOREIGN PATENT DOCUMENTS

CN     101765668 A    6/2010
EP     1553202 A1     7/2005
(Continued)

OTHER PUBLICATIONS

Machine-English translation JP 2012-041573 A, Sano Koichi et al., Mar. 1, 2012.*

(Continued)

*Primary Examiner* — Colin W. Slifka
(74) *Attorney, Agent, or Firm* — Davidson, Davidson & Kappel, LLC; Jennifer L. O'Connell

(57) ABSTRACT

The invention relates to the manufacture of a cold-rolled steel sheet having a strength of more than 900 MPa, an elastic limit of more than 700 MPa and distributed elongation of more than 12%, the composition of which includes, the contents being expressed as weight percentages: $0.26\% \leq C \leq 0.45\%$, $1.0\% \leq Mn \leq 3.0\%$, $1.0\% \leq Si \leq 3.0\%$, $Al \leq 0.10\%$, $0\% \leq Cr \leq 1.5\%$, $S \leq 0.005\%$, $P \leq 0.020\%$, $Nb \leq 0.1\%$, $Ti \leq 0.020\%$, $V \leq 0.015\%$, $N \leq 0.01\%$, the remainder of the composition being iron and inevitable impurities resulting from the production process. The microstructure, given in surface proportions, comprises 13% to 25% residual austenite and 13% to 30% MA islands, the remainder consisting of bainite and possibly ferrite.

16 Claims, No Drawings

(51) Int. Cl.
      *C22C 38/54*      (2006.01)
      *C22C 38/58*      (2006.01)
      *B32B 15/01*      (2006.01)

(56) References Cited

U.S. PATENT DOCUMENTS

| | | |
|---|---|---|
| 8,951,366 B2 | 2/2015 | Sano et al. |
| 2012/0312433 A1 | 12/2012 | Mizuta et al. |
| 2013/0037180 A1 | 2/2013 | Sano et al. |
| 2016/0355900 A1 | 12/2016 | Gil Otin et al. |

FOREIGN PATENT DOCUMENTS

| | | |
|---|---|---|
| EP | 1559798 A1 | 8/2005 |
| EP | 2325346 A1 | 5/2011 |
| EP | 2530180 A1 | 12/2012 |
| JP | 2010065272 A | 3/2010 |
| JP | 2011195956 A | 10/2011 |
| JP | 2012031462 A | 2/2012 |
| JP | 2012041573 A | 3/2012 |
| WO | 2011093319 A1 | 8/2011 |
| WO | 2012120020 A1 | 9/2012 |
| WO | 2012164579 A1 | 12/2012 |
| WO | 2013051238 A1 | 3/2015 |

OTHER PUBLICATIONS

Caballero FG, Allain S, Cornide J, Puerta Velasquez J D, Garcia-Mateo C, Miller M K; Design of cold rolled and continuous annealed carbide-free bainitic steels for automotive application, Materials & Design, 2013, 667-680, 49.

* cited by examiner

STEEL SHEET HAVING VERY HIGH MECHANICAL PROPERTIES OF STRENGTH AND DUCTILITY

The present invention relates to a propeller blade mounting system for adjustable propeller blades of aircraft, the propeller blades being pivotable about their particular longitudinal axis by rolling bearings.

This invention relates to the fabrication of very high-strength steel sheets having simultaneously mechanical strength and a deformation capability that make it possible to carry out cold forming operations. More particularly, the invention relates to steels that have a mechanical strength greater than 900 MPa, an elastic limit greater than 700 MPa and a uniform elongation greater than 12%. Vehicles and in particular land motor vehicles (automobiles, combines, tractors, tractor-trailers etc.) in particular constitute one area of application of these steel sheets with potential applications being structural parts, reinforcing elements or even the fabrication of abrasion-resistant parts.

BACKGROUND

The strong demand for a reduction of emissions of greenhouse gases, combined with increasingly strict requirements for automobile safety and the price of fuels, have given the manufacturers of land motor vehicles an incentive to making increasing use of steels with improved mechanical strength in the bodies of their vehicles to reduce the thickness of parts and therefore the weight of vehicles while maintaining structural mechanical strength. In this regard, steels that combine high strength with sufficient formability for shaping without the occurrence of cracks are becoming increasingly important. Several families of steels having different levels of mechanical strength have been proposed over time and in succession. These families include DP (for Dual Phase) steels, TRIP steels (for Transformation Induced Plasticity), Multiphase steels and even low-density steels (FeAl).

To respond to this demand for increasingly lighter-weight vehicles, it is therefore necessary to have increasingly stronger steels to compensate for the reduction in thickness. However, it is known that, in the field of carbon steels, an increase in mechanical strength is generally accompanied by a loss of ductility. In addition, the manufacturers of land motor vehicles are designing increasingly complex parts that require steels that have high levels of ductility.

WO2012164579 describes a microstructure composed principally of bainite for a steel having the following chemical composition C: 0.25-0.55, Si: 0.5-1.8, Mn: 0.8-3.8, Cr: 0.2-2.0, Ti: 0.0-0.1, Cu: 0.0-1.2, V: 0.0-0.5, Nb: 0.0-0.06, Al: 0.0-2.75, N: <0.004, P: <0.025, S: <0.025. The fabrication process for this hot bainitic steel comprises the steps of cooling the coiled sheet to ambient temperature, whereby the bainitic transformation occurs during cooling. In the framework of this patent the bainitic microstructure is obtained by a hot process that results in a thick, high-strength sheet. Cold rolling to reduce the thickness requires the application of very high forces and the hot sheet is unable to respond to the imperatives of weight reduction to meet the requirements of the automobile sector.

On the other hand, EP 1553202 describes a very high-strength steel with resistance to embrittlement caused by an elevated hydrogen content comprising: 0.06 to 0.6% C; 0.5 to 3% Si+Al; 0.5 to 3% Mn; less than 0.15% P; and less than 0.02% S by weight, whereby the microstructure including more than 3% residual austenite, more than 30% bainitic ferrite and preferably less than 50% polygonal ferrite in area ratio. The steels obtained with this invention have widely scattered characteristics in terms of mechanical properties on account of broad windows in terms of chemical composition and the metallurgical route, i.e. the production parameters.

BRIEF SUMMARY OF THE INVENTION

A purpose of this invention is to resolve the problems cited above. The invention makes available a cold-rolled steel that has a mechanical strength greater than 900 MPa, an elastic limit greater than 700 MPa and a uniform elongation greater than 12%. An additional and principal objective of the invention is to make available a steel suitable for stable production. The strength of the production route is a major component of the invention.

The fabrication cost is thereby reduced and the thermo-mechanical fabrication conditions are simplified and less scattered.

The present invention provides a cold-rolled and annealed steel with mechanical strength greater than or equal to 900 MPa, an elastic limit greater than 700 MPa and uniform elongation greater than or equal to 12%, the composition of which comprises, expressed in percent by weight: $0.26\% \leq C \leq 0.45\%$, preferably $0.26\% \leq C \leq 0.35\%$, $1.0\% \leq Mn \leq 3.0\%$, preferably $1.4\% \leq Mn \leq 2.6\%$, $1.0\% \leq Si \leq 3.0\%$, preferably $1.4\% \leq Si \leq 1.8\%$, $Al \leq 0.1\%$, $Cr \leq 1.5\%$, preferably $Cr \leq 0.5\%$, $S \leq 0.005\%$, $P \leq 0.020\%$, $Nb \leq 0.1\%$, and preferably $Nb \leq 0.05\%$, $Ti \leq 0.02\%$, $V \leq 0.015\%$, $N \leq 0.01\%$, the remainder of the composition being constituted by iron and the unavoidable impurities resulting from processing, it being understood that $256 \times C + 47 \times Mn + 150 \times Cr + 2260 \times Nb > 142$, the microstructure is constituted, in area ratio, of 13 to 25% residual austenite, 13 to 30% martensite and residual austenite islands, with the balance constituted by ferrite and bainite.

Preferably, the steel according to the invention contains a maximum 30% ferrite.

Preferably, the total elongation of the steel according to the invention is greater than 14 or even 15%.

Preferably the steel according to the invention contains a zinc or zinc alloy coating, or even an aluminum or aluminum alloy coating.

The present invention further provides a fabrication process for an annealed cold-rolled steel sheet with a strength greater than or equal to 900 MPa, an elastic limit greater than 700 MPa and elongation greater than or equal to 12%, comprising the following steps:

a steel having the composition according to the invention is obtained, then this steel is cast in the form of a semi-finished product, then this semi-finished product is brought to a temperature $T_{rech}$ between 1150° C. and 1275° C. to obtain a reheated semi-finished product, then this reheated semi-finished product is hot-rolled, the end-of-hot-rolling temperature $T_{fl}$ being greater than or equal to 850° C. to obtain a hot-rolled sheet, then this hot-rolled sheet is coiled at a temperature $T_{bob}$ between 540 and 590° C. to obtain a coiled hot-rolled sheet, then, the coiled hot-rolled sheet is cooled to ambient temperature, then, optionally, this coiled hot-rolled sheet is given a basic annealing so that the sheet is annealed at a temperature between 400° C. and 700° C. for a length of time between 5 and 24 hours.

this annealed coiled hot-rolled sheet is then uncoiled and pickled to obtain a hot-rolled sheet suitable for cold rolling, then this hot-rolled sheet suitable for cold rolling is cold rolled at a reduction rate between 30 and 80% to obtain a cold-rolled sheet, then, this cold-rolled sheet is annealed by reheating it at a rate $V_C$ between 2 and 50° C./s to a temperature $T_{soaking}$ between 760 and 1100° C., for a length of time $t_{soaking}$ between 60 and 600 seconds, then, this cold-rolled sheet is cooled by subjecting it to a cooling at a rate between 20 and 1000° C./s such that the end-of-cooling temperature $T_{OA}$ is between 360° C. and 440° C., it being understood that:

$$T_{soaking} < 1.619(T_{OA} - T1) \text{ where } T1 = -206C - 43Mn - 164Cr - 896Nb.$$

$$T_{soaking} > 1.619(T_{OA} - T2) \text{ where } T2 = 50C + 4Mn - 14Cr + 1364Nb - 132.$$

With the temperatures expressed in ° C. and the chemical compositions in percent by weight, this cold-rolled sheet is held in the temperature range from 360 to 440° C. for a period of time $T_{OA}$ between 100 and 2000 seconds.

Preferably, this sheet is held isothermally at the end-of-cooling temperature $T_{OA}$ between 360 and 440° C. and between 100 and 2000 seconds.

Preferably, the end of rolling temperature $T_{fl}$ is greater than or equal to 900° C.

Preferably, the annealed sheet is cooled to ambient temperature before being coated with zinc or a zinc alloy by means a suitable process such as electrolytic or physicochemical deposition.

Optionally, the annealed cold-rolled sheet can be coated with zinc or a zinc alloy by a hot dip galvanizing process before being cooled to ambient temperature.

Optionally, the annealed cold-rolled sheet can be coated with Al or an Al alloy by a hot dip aluminizing process before being cooled to ambient temperature.

Optionally, the annealed sheet is cold re-rolled at a cold rolling rate between 0.1 and 3%.

Preferably, the annealed and optionally coated sheet is then annealed at a hold temperature $T_{base}$ between 150 and 190° C. for a hold time $t_{base}$ between 10 h and 48 h.

Optionally, the sheet can be hot stamped after the annealing at the temperature $T_{soaking}$ and before cooling at the rate $V_C$.

The cold-rolled and annealed sheet according to the invention, or fabricated by a process according to the invention, is used for the fabrication of parts for land motor vehicles.

Other characteristics and advantages of the invention are described in greater detail below.

DETAILED DESCRIPTION

According to the invention, the carbon content, in percent by weight, is between 0.26 and 0.45%. If the carbon content of the invention is below 0.26% by weight, the mechanical strength becomes insufficient and the residual austenite fraction is still insufficient to achieve a uniform elongation greater than 12%. Above 0.45%, weldability is increasingly reduced because microstructures with low toughness are formed in the Heat Affected Zone (HAZ) or in the molten zone with resistance welding. In one preferred mode, the carbon content is between 0.26 and 0.35%. Within this range, the weldability is satisfactory, the austenite stabilization is optimized and the martensite fraction is within the range specified by the invention.

Manganese is a substitutional solid solution hardening element. It stabilizes austenite and lowers the Ac3 transformation temperature. Manganese therefore contributes to an increase in mechanical strength. According to the invention, a minimum content of 1.0% by weight is necessary to obtain the desired mechanical properties. However, above 3.0%, its gammagenic character leads to the formation of an excessively pronounced banded structure that can have an adverse effect on the forming properties of the structural automobile part, and the coatability will be reduced. Preferably, in an interval of manganese content between 1.4% and 2.6%, a satisfactory mechanical strength is achieved without increasing the risk of formation of undesirable banded structures during forming or increasing hardenability in welded alloys, which would adversely affect the suitability for welding of the sheet claimed by the invention.

The residual austenite can be stabilized by the addition of silicon, which significantly retards the precipitation of carbides during the annealing cycle and most particularly during the bainitic transformation. That results from the fact that the solubility of silicon in cementite is very low and this element increases the activity of carbon in austenite. Any formation of cementite will therefore be preceded by a step of rejection of Si at the interface. The enrichment of the austenite with carbon therefore leads to its stabilization at ambient temperature on the annealed steel sheet. Subsequently, the application of an external stress, during forming, for example, will lead to the transformation of this austenite into martensite. The result of this transformation is also to improve the resistance to damage. With regard to the properties that are an objective of the invention, an addition of silicon in a quantity greater than 3.0% will significantly promote the ferrite and the desired mechanical strength would not be achieved, plus strongly adherent oxides would be formed that would lead to surface defects; the minimum quantity must also be set at 1.0% by weight to obtain the stabilizing effect on the austenite. The silicon content will preferably be between 1.4% and 1.8% to optimize the above mentioned effects.

The chromium content must be limited to 1.5%. This element makes it possible to control the formation of proeutectoid ferrite during cooling at the time of the annealing starting from this soaking temperature $T_{soaking}$. This ferrite, in large quantities, reduces the necessary mechanical strength of the sheet according to the invention. This element also makes it possible to harden and refine the bainitic microstructure. The chromium content will preferably be less than 0.5% for cost reasons and to prevent excessive hardening.

Nickel and copper have effects that are essentially similar to that of manganese. These two elements will be present in residual levels.

The aluminum content is limited to 0.1% by weight. Aluminum is a powerful alphagenic element that promotes the formation of ferrite. A high level of aluminum would increase the Ac3 point and therefore make the industrial process expensive in terms of the energy input required for the annealing. It should also be borne in mind that high levels of aluminum increase the erosion of refractories and the risk of clogging nozzles during the casting of the steel upstream of the rolling. Aluminum also segregates negatively and can lead to macro-segregations. In excessive quantities, aluminum reduces hot ductility and increases the risk of the occurrence of defects during continuous casting. Without strict control of the casting conditions, micro and macro segregation defects ultimately result in a central segregation on the annealed steel sheet. This central band will be harder than its surrounding matrix and will have an adverse effect on the formability of the material.

For sulfur, above a content of 0.005%, the ductility is reduced on account of the excessive presence of sulfides such as MnS, i.e. manganese sulfides that reduce suitability for deformation.

Phosphorus is an element that hardens in solid solution but that significantly reduces the suitability for spot welding and hot ductility, in particular on account of its tendency to segregate at grain boundaries or its tendency toward co-segregation with manganese. For these reasons, its content must be limited to 0.020% to achieve proper suitability for spot welding.

Niobium is a micro-alloy element that has the particular characteristic of forming precipitates that harden with carbon and/or nitrogen. These precipitates, which are already present at the time of the hot rolling operation, retard recrystallization during the annealing and therefore refine the microstructure, which makes it possible to contribute to the hardening of the material. It also makes it possible to improve the elongation properties of the product by making possible high-temperature annealing without reducing the elongation performance by the effect of refining the structures. Nevertheless, the niobium content must be limited to 0.1% to prevent excessive hot rolling forces and for economic reasons. The niobium content will preferably be less than 0.05% to avoid excessive hardening of the cold-rolled sheet and for cost reasons. In another embodiment, the niobium content is preferably greater than or equal to 0.001%, which makes it possible to have a hardening of the ferrite when it is present and when such hardening is desired.

The other micro-alloy elements such as titanium and vanadium are respectively limited to maximums of 0.02% and 0.015% respectively, because these elements have the same advantages as niobium although they have the particular characteristic of reducing the ductility of the product. This limitation is also economical.

Nitrogen is limited to 0.01% to prevent aging phenomena of the material and to minimize the precipitation of aluminum nitrides (AlN) during solidification and thus the embrittlement of the semi-finished product.

The balance of the composition is constituted by iron and the unavoidable impurities resulting from processing.

According to the invention, the microstructure of the steel must contain, in area ratio, from 13 to 25% austenite. If the residual austenite content is less than 13%, the uniform elongation will be less than 12%. If it is greater than 25%, the residual austenite will be unstable because it is not sufficiently enriched with carbon and the ductility of the steel will be reduced; the elastic limit will be less than 700 MPa.

The steel according to the invention must also contain between 13 and 30% MA islands, i.e. islands of residual austenite and martensite, whereby the latter can be untreated or tempered in any appropriate manner. If the content of MA islands is less than 13%, the mechanical strength of 900 MPa will not be achieved, and if it is greater than 30%, the uniform elongation will be less than 12%.

The balance of the microstructure is constituted by bainite and optionally ferrite. Ferrite, when it is present, is preferably of the polygonal type.

The sheet according to the invention can be fabricated by any suitable process. For example, the process according to the invention can be used, which can comprise the steps described below.

First, a steel having the composition according to the invention is obtained. Then a semi-finished product is cast from this steel. This casting can be in the form of ingots or continuous in the form of slabs.

The cast semi-finished products can then be brought to a temperature $T_{rech}$ greater than 1150° C. to obtain a reheated semi-finished product so that in all points a temperature is reached that is favorable to the high deformations that the steel will undergo during rolling. This temperature interval makes it possible to be in the austenitic range. However, if the temperature $T_{rech}$ is greater than 1275° C., the austenitic grains grow undesirably and will lead to a coarser final structure and increased risks of surface defects linked to the presence of liquid oxide. Of course it is also possible to perform the hot rolling directly after the casting without reheating the slab.

The semi-finished product is therefore hot rolled in a temperature range where the structure of the steel is entirely austenitic. If the end-of rolling temperature $T_{fl}$ is less than 850° C., the rolling forces are very high and can consume large amounts of energy. Preferably, the end-of-rolling temperature is greater than 900° C.

The hot-rolled product is then coiled at a temperature $T_{bob}$ between 540 and 590° C. This temperature range makes it possible to obtain ferritic, bainitic or pearlitic, transformations during the quasi-isothermal soaking associated with the coiling followed by a slow cooling to minimize the martensite fraction after cooling. A coiling temperature greater than 590° C. leads to the formation of undesirable surface oxides. When the coiling temperature is too low, below 540° C., the hardness of the product after cooling is increased, which increases the forces necessary during the later cold rolling.

The hot-rolled product is then pickled, if necessary, using a process that is in itself known.

Optionally, an intermediate base annealing of the coiled hot-rolled product is performed between $T_{RB1}$ and $T_{RB2}$ with $T_{RB1}=400°$ C. and $T_{RB2}=700°$ C. for a length of time between 5 and 24 hours.

This heat treatment makes it possible to have a mechanical strength below 1000 MPa at all points of the hot-rolled sheet, the difference in hardness between the center of the sheet and the edges being thus minimized. This makes the following cold-rolling step significantly easier by a tempering of the structure formed.

The sheet is then cold rolled with a reduction rate preferably between 30 and 80%.

The cold-rolled product is then re-heated, preferably in a continuous annealing installation, at an average heat rate $V_C$ between 2 and 50° C. per second. In relation to the annealing temperature $T_{soaking}$ mentioned below, this range of heat rates makes it possible to obtain an adequate recrystallization and refining of the structure. Below 2° C. per second, the risks of surface decarburization are avoided. Above 50° C. per second, the presence of traces of non-recrystallization and insoluble carbides during soaking, which would have the effect of reducing the residual austenite fraction, are avoided.

The sheet is heated to an annealing temperature $T_{soaking}$ between the temperature 760° C. and 1100° C. A $T_{soaking}$ temperature less than 760° C. promotes the presence of non-recrystallizable phases which have an adverse effect on elongation. Conversely, if $T_{soaking}$ is above 1100° C., the austenitic grain sizes increase significantly, which has an adverse effect on the refining of the final microstructure and therefore on the levels of the elastic limit.

A hold time $t_{soaking}$ between 60 and 600 seconds at the temperature $T_{soaking}$ makes possible the dissolution of the previously formed carbides and above all a sufficient transformation into austenite. Below 60 seconds, the dissolution of the carbides would be insufficient. On the other hand, a hold time longer than 600 seconds is scarcely compatible with the productivity requirements of continuous annealing installations, in particular the payout speed of the coil. The hold time $t_{soaking}$ is therefore between 60 and 600 seconds.

At the conclusion of the annealing soaking, the sheet is cooled until it reaches a temperature $T_{OA}$ between $T_{OA1}$=360° C. and $T_{OA2}$=440° C., the rate of cooling $V_{ref}$ being sufficiently rapid to prevent the formation of pearlite. For this purpose, this cooling rate is between 20° C. and 1000° C. per second. Beyond 1000° C. per second, it becomes difficult to achieve the desired temperature $T_{OA}$ with precision. Below 360° C., the fraction of bainite is too large and the residual austenite fraction is insufficient, and its stability is consequently too great. The elongations are then insufficient, i.e. less than 12% for uniform elongation. Above 440° C., the bainite fraction is too low to make it possible to stabilize a sufficient austenite fraction, although it promotes the undesirable presence of an excessive martensite fraction. The elastic limits or elongations are then insufficient.

The hold time $t_{OA}$ in the temperature range $T_{OA1}$ (° C.) to $T_{OA2}$ (° C.) must be greater than 100 seconds to allow the bainitic transformation and therefore the stabilization of the austenite by enrichment of this austenite with carbon. It must also be less than 2000 seconds to prevent the precipitation of carbides, which would have the effect of reducing the residual austenite fraction and would therefore have an adverse effect on the ductility of the product.

The pair consisting of the annealing temperature $T_{soaking}$ and that of the hold at $T_{OA}$ is defined by the relations (1) and (2) below:

$T°_{soaking}$<1.619($T_{OA}-T_1$) where $T_1$=−206C−43Mn−164Cr−896Nb   Relation 1:

$T°_{soaking}$>1.619($T_{OA}-T_2$) where $T_2$=50C+4Mn−14Cr+1364Nb−132   Relation 2:

with the temperatures expressed in ° C. and the chemical compositions in percent by weight. This soaking is preferably isothermal.

Complying with these relations between the chemical composition and the annealing temperature $T_{soaking}$ and the hold temperature $T_{OA}$ makes it possible to achieve, in a stable manner, a strength greater than 900 MPa, an elastic limit greater than 700 MPa and finally a uniform elongation greater than 12%. This is an essential point of the invention because it allows the metallurgical production route to be stable, thereby making it possible to obtain a sheet that does not have different mechanical responses as a function of variances and fluctuations of the production process in the ranges of temperatures and chemical composition of elements of the invention.

Another alternative would be to deposit Zn or a Zn alloy (more than 50% Zn in percent by weight) in the form of a hot dip coating before cooling to ambient temperature. Preferably, a zinc or zinc alloy coating can also be applied by any known electrolytic or physico-chemical process to the bare annealed sheet. A coating based on aluminum or aluminum-based alloy (more than 50% by weight aluminum) can also be deposited by a hot dip coating process.

A post basic annealing treatment can then preferably be performed on the cold rolled, annealed and optionally coated sheet, at a hold temperature $T_{base}$ between 150° C. and 190° C. for a hold time $t_{base}$ between 10 hours and 48 hours to improve the elastic limit and bendability. This treatment will be called "post basic annealing".

The invention is illustrated by the following non-restrictive examples.

EXAMPLES

Steels having the composition presented in the following table, expressed in percent by weight, were prepared. Table 1 indicates the chemical composition of the steel that was used for the fabrication of the sheets according to the invention.

TABLE 1

| Chemical compositions (% by weight). | | | | | | | | | | | | | | |
|---|---|---|---|---|---|---|---|---|---|---|---|---|---|---|
| Steel | C | Mn | Si | Al | Cr | Mo | Cu | Ni | V | Nb | S | P | B | Ti | N |
| A | 0.24 | 1.51 | 1.48 | 0.002 | 0.007 | 0.002 | 0.007 | 0.004 | 0.002 | 0.002 | 0.0015 | 0.0135 | 0.0004 | 0.001 | 0.004 |
| B | 0.29 | 1.50 | 1.48 | 0.002 | 0.007 | 0.002 | 0.007 | 0.004 | 0.002 | 0.002 | 0.0015 | 0.0134 | 0.0004 | 0.001 | 0.005 |
| C | 0.29 | 1.51 | 1.48 | 0.002 | 0.007 | 0.002 | 0.007 | 0.004 | 0.002 | 0.012 | 0.0015 | 0.0140 | 0.0004 | 0.001 | 0.006 |
| D | 0.27 | 2.05 | 1.44 | 0.002 | 0.007 | 0.002 | 0.007 | 0.004 | 0.002 | 0.030 | 0.0009 | 0.0133 | 0.0004 | 0.001 | 0.006 |
| E | 0.31 | 1.48 | 1.49 | 0.003 | 0.003 | 0.002 | 0.002 | 0.002 | 0.002 | 0.001 | 0.0030 | 0.0160 | 0.0004 | 0.001 | 0.000 |
| F | 0.31 | 2.46 | 1.52 | 0.003 | 0.080 | 0.012 | 0.001 | 0.001 | 0.002 | 0.002 | 0.0030 | 0.0020 | 0.0004 | 0.001 | 0.001 |
| G | 0.31 | 2.46 | 1.49 | 0.003 | 0.014 | 0.002 | 0.005 | 0.005 | 0.002 | 0.002 | 0.002 | 0.004 | 0.0005 | 0.0008 | 0.004 |

Sheets corresponding to the above compositions were produced according to the fabrication conditions presented in table 2.

Beginning with these compositions, certain steels were subjected to different annealing conditions. The conditions before hot rolling are identical with a reheating between 1230° C. and 1275° C., an end-of-rolling temperature between 930° C. and 990° C. and a coiling temperature between 550° C. and 580° C. The hot-rolled products were then all pickled and then, depending on the steel, were immediately cold-rolled or annealed prior to the cold rolling with a reduction rate between 60 and 70%.

Table 2 also indicates the fabrication conditions of the sheets annealed after cold rolling, with the following nomenclature:

reheat temperature: $T_{rech}$ end-of-rolling temperature: $T_{fl}$ coiling temperature: $T_{BOB}$ basic annealing temperature: $T_{RB}$ hold time at $T_{RB}$: $t_{RB}$ cold rolling reduction rate heat rate: $V_C$ soaking temperature: $T_{soaking}$ hold time at $T_{soaking}$: $t_{soaking}$ cooling rate: $V_{ref}$ end-of-cooling temperature $T_{OA}$ hold time at the temperature $T_{OA}$: $t_{OA}$ temperatures calculated with relations 1 and 2

TABLE 2

Annealing conditions of the reference examples

| Acier | ID | $T_{rech}$ (°C.) | $T_{fl}$ (°C.) | $T_{BOB}$ (°C.) | $T_{RB}$ (°C.) | $t_{RB}$ (s) | Taux de réduction (%) | $V_C$ (°C./s) | $T_{Soaking}$ (°C.) | $V_{ref}$ (°C./s) | $t_{Soaking}$ (s) | $T_{OA}$ (°C.) | $t_{OA}$ (s) | T1 (°C.) | T2 (°C.) | Relation 1 | Relation 2 |
|---|---|---|---|---|---|---|---|---|---|---|---|---|---|---|---|---|---|
| A | A_1 | 1250 | 967 | 576 | 550 | 6 | 67 | 5 | 830 | 95 | 180 | <u>350</u> | 1000 | −115 | −114 | <u>752</u> | 751 |
| A | A_2 | 1250 | 967 | 576 | 550 | 6 | 67 | 5 | 830 | 95 | 180 | 400 | 500 | −115 | −114 | 833 | <u>832</u> |
| A | A_3 | 1250 | 967 | 576 | 550 | 6 | 67 | 5 | 830 | 95 | 180 | 425 | 500 | −115 | −114 | 874 | <u>872</u> |
| A | A_4 | 1250 | 967 | 576 | 550 | 6 | 67 | 5 | 900 | 95 | 180 | <u>350</u> | 1000 | −115 | −114 | <u>752</u> | 751 |
| A | A_5 | 1250 | 967 | 576 | 550 | 6 | 67 | 5 | 900 | 95 | 180 | 400 | 500 | −115 | −114 | <u>833</u> | 832 |
| A | A_6 | 1250 | 967 | 576 | 550 | 6 | 67 | 5 | 900 | 95 | 180 | 425 | 500 | −115 | −114 | <u>874</u> | 872 |
| A | A_7 | 1250 | 967 | 576 | 650 | 6 | 67 | 5 | 830 | 95 | 180 | 400 | 500 | −115 | −114 | 833 | <u>832</u> |
| A | A_8 | 1250 | 967 | 576 | 650 | 6 | 67 | 5 | 900 | 95 | 180 | 400 | 500 | −115 | −114 | <u>833</u> | 832 |
| B | B_1 | 1245 | 939 | 564 | 550 | 6 | 67 | 5 | 790 | 95 | 70 | <u>350</u> | 1000 | −125 | −111 | <u>769</u> | 747 |
| B | B_2 | 1245 | 939 | 564 | 550 | 6 | 67 | 5 | 790 | 95 | 70 | 400 | 500 | −125 | −111 | 850 | <u>828</u> |
| B | B_3 | 1245 | 939 | 564 | 550 | 6 | 67 | 5 | 790 | 95 | 70 | 425 | 500 | −125 | −111 | 890 | <u>868</u> |
| B | B_4 | 1245 | 939 | 564 | 550 | 6 | 67 | 5 | 790 | 95 | 70 | <u>450</u> | 500 | −125 | −111 | 931 | <u>909</u> |
| B | B_5 | 1245 | 939 | 564 | 550 | 6 | 67 | 5 | 830 | 95 | 180 | <u>350</u> | 1000 | −125 | −111 | <u>769</u> | 747 |
| B | B_6 | 1245 | 939 | 564 | 550 | 6 | 67 | 5 | 830 | 95 | 180 | 400 | 500 | −125 | −111 | 850 | 828 |
| B | B_7 | 1245 | 939 | 564 | 550 | 6 | 67 | 5 | 830 | 95 | 180 | 425 | 500 | −125 | −111 | 890 | <u>868</u> |
| B | B_8 | 1245 | 939 | 564 | 550 | 6 | 67 | 5 | 830 | 95 | 180 | <u>450</u> | 500 | −125 | −111 | 931 | <u>909</u> |
| B | B_9 | 1245 | 939 | 564 | 550 | 6 | 67 | 5 | 900 | 95 | 180 | <u>350</u> | 1000 | −125 | −111 | <u>769</u> | 747 |
| B | B_10 | 1245 | 939 | 564 | 550 | 6 | 67 | 5 | 900 | 95 | 180 | 400 | 500 | −125 | −111 | <u>850</u> | 828 |
| B | B_11 | 1245 | 939 | 564 | 550 | 6 | 67 | 5 | 900 | 95 | 180 | 425 | 500 | −125 | −111 | <u>890</u> | 868 |
| B | B_12 | 1245 | 939 | 564 | 550 | 6 | 67 | 5 | 900 | 95 | 180 | <u>450</u> | 500 | −125 | −111 | 931 | <u>909</u> |
| C | C_1 | 1248 | 955 | 570 | 550 | 6 | 67 | 5 | 790 | 95 | 70 | <u>350</u> | 1000 | −136 | −95 | <u>787</u> | 720 |
| C | C_2 | 1248 | 955 | 570 | 550 | 6 | 67 | 5 | 790 | 95 | 70 | 400 | 500 | −136 | −95 | 868 | <u>801</u> |
| C | C_3 | 1248 | 955 | 570 | 550 | 6 | 67 | 5 | 790 | 95 | 70 | 425 | 500 | −136 | −95 | 908 | <u>842</u> |
| C | C_4 | 1248 | 955 | 570 | 550 | 6 | 67 | 5 | 790 | 95 | 70 | <u>450</u> | 500 | −136 | −95 | 948 | <u>882</u> |
| C | C_5 | 1248 | 955 | 570 | 550 | 6 | 67 | 5 | 830 | 95 | 180 | <u>350</u> | 1000 | −136 | −95 | <u>787</u> | 720 |
| C | C_6 | 1248 | 955 | 570 | 550 | 6 | 67 | 5 | 830 | 95 | 180 | 400 | 500 | −136 | −95 | 868 | 801 |
| C | C_7 | 1248 | 955 | 570 | 550 | 6 | 67 | 5 | 830 | 95 | 180 | 425 | 500 | −136 | −95 | 908 | <u>842</u> |
| C | C_8 | 1248 | 955 | 570 | 550 | 6 | 67 | 5 | 830 | 95 | 180 | <u>450</u> | 500 | −136 | −95 | 948 | <u>882</u> |
| C | C_9 | 1248 | 955 | 570 | 550 | 6 | 67 | 5 | 900 | 95 | 180 | <u>350</u> | 1000 | −136 | −95 | <u>787</u> | 720 |
| C | C_10 | 1248 | 955 | 570 | 550 | 6 | 67 | 5 | 900 | 95 | 180 | 400 | 500 | −136 | −95 | <u>868</u> | 801 |
| C | C_11 | 1248 | 955 | 570 | 550 | 6 | 67 | 5 | 900 | 95 | 180 | 425 | 500 | −136 | −95 | 908 | <u>842</u> |
| C | C_12 | 1248 | 955 | 570 | 550 | 6 | 67 | 5 | 900 | 95 | 180 | <u>450</u> | 500 | −136 | −95 | 948 | <u>882</u> |
| C | C_13 | 1248 | 955 | 570 | 650 | 6 | 67 | 5 | 790 | 95 | 70 | 400 | 500 | −136 | −95 | 868 | 801 |
| C | C_14 | 1248 | 955 | 570 | 650 | 6 | 67 | 5 | 830 | 95 | 180 | 400 | 500 | −136 | −95 | 868 | 801 |
| C | C_15 | 1248 | 955 | 570 | 650 | 6 | 67 | 5 | 900 | 95 | 180 | 400 | 500 | −136 | −95 | <u>868</u> | 801 |
| D | D_1 | 1254 | 983 | 562 | 550 | 6 | 67 | 5 | 770 | 95 | 70 | <u>350</u> | 1000 | −171 | −69 | 844 | <u>679</u> |
| D | D_2 | 1254 | 983 | 562 | 550 | 6 | 67 | 5 | 770 | 95 | 70 | 400 | 500 | −171 | −69 | <u>925</u> | 760 |
| D | D_3 | 1254 | 983 | 562 | 550 | 6 | 67 | 5 | 770 | 95 | 70 | 425 | 500 | −171 | −69 | <u>966</u> | 800 |
| D | D_4 | 1254 | 983 | 562 | 550 | 6 | 67 | 5 | 770 | 95 | 70 | <u>450</u> | 500 | −171 | −69 | 1006 | <u>841</u> |
| D | D_5 | 1254 | 983 | 562 | 550 | 6 | 67 | 5 | 830 | 95 | 180 | <u>350</u> | 1000 | −171 | −69 | 844 | <u>679</u> |
| D | D_6 | 1254 | 983 | 562 | 550 | 6 | 67 | 5 | 830 | 95 | 180 | 400 | 500 | −171 | −69 | 925 | <u>760</u> |
| D | D_7 | 1254 | 983 | 562 | 550 | 6 | 67 | 5 | 830 | 95 | 180 | 425 | 500 | −171 | −69 | <u>966</u> | 800 |
| D | D_8 | 1254 | 983 | 562 | 550 | 6 | 67 | 5 | 830 | 95 | 180 | <u>450</u> | 500 | −171 | −69 | 1006 | 841 |
| D | D_9 | 1254 | 983 | 562 | 550 | 6 | 67 | 5 | 900 | 95 | 180 | <u>350</u> | 1000 | −171 | −69 | 844 | <u>679</u> |
| D | D_10 | 1254 | 983 | 562 | 550 | 6 | 67 | 5 | 900 | 95 | 180 | 400 | 500 | −171 | −69 | 925 | 760 |
| D | D_11 | 1254 | 983 | 562 | 550 | 6 | 67 | 5 | 900 | 95 | 180 | 425 | 500 | −171 | −69 | <u>966</u> | 800 |
| D | D_12 | 1254 | 983 | 562 | 550 | 6 | 67 | 5 | 900 | 95 | 180 | <u>450</u> | 500 | −171 | −69 | 1006 | <u>841</u> |
| D | D_13 | 1254 | 983 | 562 | 650 | 6 | 67 | 5 | 830 | 95 | 180 | 400 | 500 | −171 | −69 | <u>925</u> | 760 |
| D | D_14 | 1254 | 983 | 562 | 650 | 6 | 67 | 5 | 900 | 95 | 180 | 400 | 500 | −171 | −69 | 925 | <u>760</u> |
| E | E_1 | 1266 | 932 | 558 | N.R. | N.R. | 62 | 5 | 880 | 95 | 180 | 425 | 500 | −128 | −110 | 895 | 865 |
| F | F_1 | 1234 | 946 | 563 | N.R. | N.R. | 63 | 5 | 900 | 95 | 90 | <u>300</u> | 1800 | −184 | −105 | 783 | <u>656</u> |
| F | F_2 | 1234 | 946 | 563 | N.R. | N.R. | 63 | 5 | 900 | 95 | 90 | 400 | 1800 | −184 | −105 | 945 | <u>818</u> |
| G | G_1 | 1270 | 951 | 553 | N.R. | N.R. | 64 | 5 | 860 | 95 | 180 | <u>325</u> | 1200 | −170 | −107 | 801 | <u>699</u> |
| G | G_2 | 1270 | 951 | 553 | N.R. | N.R. | 64 | 5 | 860 | 95 | 180 | <u>350</u> | 1200 | −170 | −107 | 842 | <u>739</u> |
| G | G_3 | 1270 | 951 | 553 | N.R. | N.R. | 64 | 5 | 860 | 95 | 180 | 375 | 1200 | −170 | −107 | 882 | <u>780</u> |
| G | G_4 | 1270 | 951 | 553 | N.R. | N.R. | 64 | 5 | 860 | 95 | 180 | 400 | 1200 | −170 | −107 | 923 | <u>820</u> |
| G | G_5 | 1270 | 951 | 553 | N.R. | N.R. | 64 | 5 | 860 | 95 | 180 | 425 | 1200 | −170 | −107 | 963 | <u>861</u> |
| G | G_6 | 1270 | 951 | 553 | N.R. | N.R. | 64 | 5 | 860 | 95 | 180 | <u>450</u> | 1200 | −170 | −107 | 1004 | 901 |

References A1 to A8, B1 to B5, B7 to B12, C1 to C5, C7 to C10, C12, C13, C15, D1, D3 to D5, D8, D9, D12, F1, G1, G2, G5 and G6 in table 2 designate the steel sheets fabricated under conditions that are not in conformance with the invention from steels, the compositions of which are indicated in table 1. The parameters not in conformance with the invention are underlined.

It should be noted that the two references D1 and D5 are not in conformance with the invention, because the end-of-cooling temperature $T_{OA}$ is less than 360° C., which would promote a large quantity of bainitic ferrite and a small quantity of residual austenite, thereby limiting the ductility of the sheet.

It should also be noted that the two references C12 and D12 are not in conformance with the invention because the end-of-cooling temperature is greater than 440° C., which would promote a small quantity of bainitic ferrite and an unstable residual austenite, thereby limiting the ductility and the elastic limit of the sheet.

It should also be noted that references A5, A6, A8, B10, B11, C10 and C15 are not in conformance with the invention because the temperature $T_{soaking}$ is less than the temperature calculated by relation 1, depending on their respective composition.

It should also be noted that references A2, A3, A7, B2, B3, B7, C2, C3, C7, C13, D3 and G5 are not in conformance with the invention because the temperature $T_{soaking}$ is higher than the temperature calculated by relation 2, also depending on their respective composition.

Finally, it should be noted that references A1, A4, B1, B4, B5, B7, B9, B12, C1, C4, C5, C8, C9, D4, D8, D9, F1, G1, G2 and G6 are not in conformance with the invention because the end-of-cooling temperature $T_{OA}$ is outside the range 360° C.-440° C. and that the soaking temperature $T_{soaking}$ is either below the temperature calculated with relation 1 or higher than the temperature calculated with relation 2, which results in the undesirable consequences described above.

Examples B6, C6, C11, C14, D2, D6, D7, D10, D11, D13, D14, E1, F2, G3 and G4 are those according to the invention.

The mechanical properties are then measured using a test piece in accordance with ISO 12.5×50. The uni-axial tensile stresses applied to measure these mechanical properties are applied in the direction parallel to the direction of the cold rolling.

The mechanical properties under tensile stress measures are presented in table 3 below, with the following abbreviations:
elastic limit: Re
mechanical strength: Rm
uniform elongation: Al. Unif.
total elongation: Al. Total.

TABLE 3

Mechanical properties of the references and the invention

| Acier | ID | Re (MPa) | Rm (MPa) | Al. Unif. (%) | Al. Total. (%) | Re/Rm | RexAl. Unif. (MPa. %) |
|---|---|---|---|---|---|---|---|
| A | A_1 | 659 | 969 | 9.3 | 12.7 | 0.68 | 6129 |
| A | A_2 | 581 | 862 | 16.4 | 21.6 | 0.67 | 9528 |
| A | A_3 | 530 | 852 | 16.5 | 18.2 | 0.62 | 8745 |
| A | A_4 | 1076 | 1286 | 2.4 | 3.7 | 0.84 | 2582 |
| A | A_5 | 843 | 1025 | 9.4 | 14.5 | 0.82 | 7924 |
| A | A_6 | 762 | 968 | 10.0 | 12.0 | 0.79 | 7620 |
| A | A_7 | 569 | 852 | 21.0 | 26.2 | 0.67 | 11949 |
| A | A_8 | 848 | 1021 | 7.5 | 12.5 | 0.83 | 6360 |
| B | B_1 | 594 | 928 | 20.2 | 25.2 | 0.64 | 11999 |
| B | B_2 | 578 | 880 | 23.7 | 28.7 | 0.66 | 13699 |
| B | B_3 | 581 | 924 | 21.5 | 26.1 | 0.63 | 12492 |
| B | B_4 | 539 | 966 | 15.6 | 18.6 | 0.56 | 8408 |
| B | B_5 | 835 | 1115 | 6.9 | 11.4 | 0.75 | 5762 |
| B | B_6 | 714 | 966 | 12.8 | 17.5 | 0.74 | 9139 |
| B | B_7 | 658 | 954 | 16.2 | 19.1 | 0.69 | 10660 |
| B | B_8 | 574 | 974 | 12.9 | 16.9 | 0.59 | 7405 |
| B | B_9 | 1171 | 1363 | 2.7 | 5.7 | 0.86 | 3162 |
| B | B_10 | 878 | 1069 | 7.4 | 10.0 | 0.82 | 6497 |
| B | B_11 | 785 | 1013 | 10.9 | 15.3 | 0.77 | 8557 |
| B | B_12 | 678 | 1001 | 8.5 | 10.5 | 0.68 | 5763 |
| C | C_1 | 577 | 902 | 13.9 | 16.4 | 0.64 | 8020 |
| C | C_2 | 578 | 889 | 24.5 | 29.2 | 0.65 | 14161 |
| C | C_3 | 569 | 928 | 22.3 | 27.6 | 0.61 | 12689 |
| C | C_4 | 524 | 930 | 13.9 | 15.6 | 0.56 | 7284 |
| C | C_5 | 725 | 1016 | 8.5 | 12.4 | 0.71 | 6163 |
| C | C_6 | 623 | 920 | 19.4 | 25.0 | 0.68 | 12086 |
| C | C_7 | 641 | 950 | 18.8 | 24.2 | 0.67 | 12051 |
| C | C_8 | 549 | 959 | 13.7 | 17.3 | 0.57 | 7521 |
| C | C_9 | 1152 | 1345 | 2.3 | 3.4 | 0.86 | 2650 |
| C | C_10 | 890 | 1064 | 9.1 | 13.8 | 0.84 | 8099 |
| C | C_11 | 800 | 1024 | 12.1 | 15.1 | 0.78 | 9680 |
| C | C_12 | 694 | 1001 | 9.8 | 13.9 | 0.69 | 6801 |
| C | C_13 | 583 | 856 | 20.0 | 22.6 | 0.68 | 11660 |
| C | C_14 | 711 | 931 | 13.7 | 16.9 | 0.76 | 9741 |
| C | C_15 | 878 | 1052 | 7.7 | 10.1 | 0.83 | 6761 |
| D | D_1 | 674 | 1129 | 15.2 | 16.9 | 0.60 | 10245 |
| D | D_2 | 708 | 1129 | 15.2 | 15.6 | 0.63 | 10762 |
| D | D_3 | 548 | 1211 | 13.1 | 13.2 | 0.45 | 7179 |
| D | D_4 | 492 | 1269 | 5.9 | 6.0 | 0.39 | 2903 |
| D | D_5 | 935 | 1221 | 4.8 | 7.3 | 0.77 | 4488 |
| D | D_6 | 759 | 1097 | 14.5 | 17.9 | 0.69 | 11006 |
| D | D_7 | 747 | 1130 | 14.0 | 14.2 | 0.66 | 10458 |
| D | D_8 | 519 | 1212 | 12.0 | 14.1 | 0.43 | 6228 |
| D | D_9 | 1115 | 1386 | 5.1 | 7.6 | 0.80 | 5687 |
| D | D_10 | 863 | 1168 | 12.1 | 15.4 | 0.74 | 10442 |
| D | D_11 | 755 | 1139 | 12.8 | 16.0 | 0.66 | 9664 |
| D | D_12 | 507 | 1192 | 8.9 | 9.1 | 0.43 | 4512 |
| D | D_13 | 810 | 1078 | 15.4 | 19.3 | 0.75 | 12474 |
| D | D_14 | 839 | 1137 | 12.9 | 17.0 | 0.74 | 10823 |
| E | E_1 | 799 | 1041 | 13.4 | 20.9 | 0.74 | 10707 |
| F | F_1 | 1427 | 1712 | 2.7 | 5.4 | 0.74 | 3780 |
| F | F_2 | 879 | 1275 | 12.1 | 16.1 | 0.74 | 10630 |
| G | G_1 | 1127 | 1565 | 5.5 | 8.6 | 0.74 | 6142 |
| G | G_2 | 1013 | 1381 | 8.8 | 12.6 | 0.74 | 8914 |
| G | G_3 | 845 | 1294 | 12.1 | 14.8 | 0.74 | 10225 |
| G | G_4 | 701 | 1289 | 12.1 | 14.5 | 0.74 | 8482 |
| G | G_5 | 661 | 1394 | 10.4 | 11.2 | 0.74 | 6869 |
| G | G_6 | 780 | 1517 | 6.2 | 6.2 | 0.74 | 4836 |

References A1 to A8, B1 to B5, B7 to B12, C1 to C5, C7 to C10, C12, C13, C15, D1, D3 to D5, D8, D9, D12, F1, G1, G2, G5 and G6 in table 3 designate steel sheets fabricated according to the conditions described in table 2 from steels, the compositions of which are presented in table 1. The mechanical properties not in conformance with the invention are underlined.

Examples B6, C6, C11, C14, D2, D6, D7, D10, D11, D13, D14, E1, F2, G3 and G4 are those according to the invention.

It should be noted that references B1, B3, B4, B7, B8, C1, C3, C4, C7, C8, D1, D3 and D8 are not in conformance with the invention because the elastic limit Re is less than 700 MPa, which indicates either too low a quantity of bainitic ferrite due to an end-of-cooling temperature $T_{OA}$ greater than 440° C. or too great a quantity of polygonal ferrite due to a soaking temperature $T_{soaking}$ below that calculated with relation 1.

It should also be noted that the references A4 to A6, A8, B2, B11, C5, C9, C10, C15, D5, D9, F1, G1, G2 and G6 are not in conformance with the invention because the uniform elongation is less than 12%, which reflects either too low a quantity of polygonal ferrite due to a soaking temperature $T_{soaking}$ higher than that calculated with relation 2 or too low a quantity of residual austenite due to an end-of-cooling temperature $T_{OA}$ below 360° C.

It should also be noted that references A1, B5, B6, B12 and C12 are not in conformance with the invention because the elastic limit Re and the uniform elongation are less than 700 MPa and 12% respectively, which reflects too great a quantity of MA islands due to an end-of-cooling temperature greater than 440° C.

Finally, it should be noted that references A2, A3, A7, B2, C2, C13, D4, D12 and G5 are not in conformance with the invention because the elastic limit Re and the mechanical strength Rm are less than 700 MPa and 900 MPa respectively, which reflects too great a quantity of polygonal ferrite and consequently a soaking temperature $T_{soaking}$ below the temperature calculated with relation 1, and too low a quantity of MA islands due to too low an end-of-cooling temperature $T_{O4}$.

The invention makes it possible to have a steel sheet suitable for the deposition of a coating of zinc or zinc alloy, in particular via conventional electrogalvanization processes.

The invention also makes it possible to have a steel sheet suitable for the deposition of a coating of zinc or zinc alloy, in particular via a hot-dip process in a bath of liquid zinc, which may or may not be followed by a thermal alloying treatment.

Finally, it also makes it possible to have a steel that has good suitability for welding by means of conventional assembly methods such as, by way of a non-limiting example, resistance spot welding.

The steel sheet according to the invention can be advantageously used for the fabrication of structural parts, reinforcement components, safety components, anti-abrasives or transmission discs for application in land motor vehicles.

What is claimed is:

1. A cold-rolled and annealed steel sheet with mechanical strength greater than or equal to 900 MPa, an elastic limit greater than 700 MPa and uniform elongation greater than or equal to 12%, the composition of which comprises, expressed in percent by weight:

0.26%≤C≤0.45%;

1.0%≤Mn≤3.0%;

1.0%≤Si≤3.0%;

Al≤0.1%;

Cr≤1.5%;

S≤0.005%;

P≤0.020%;

Nb≤0.1%;

Ti≤0.02%;

V≤0.015%; and

N≤0.01%;

a balance of the composition including iron and unavoidable impurities resulting from processing;

256$x$C+47$x$Mn+150$x$Cr+2260$x$Nb>142; and a microstructure of the steel sheet including, in area percentages:
from 13 to 25% residual austenite; and
from 13 to 30% islands of residual austenite and martensite;
a balance of the microstructure including bainite formed at a temperature from 360 to 440 degrees C.

2. The steel sheet according to claim 1, wherein the balance of the microstructure includes ferrite.

3. The steel sheet according to claim 1, wherein the composition includes, expressed in percent by weight, 0.26%≤C≤0.35%.

4. The steel sheet according to claim 1, wherein the composition includes, expressed in percent by weight, 1.4%≤Mn≤2.6%.

5. The steel sheet according to claim 1, wherein the composition includes, expressed in percent by weight, 1.4%≤Si≤1.8%.

6. The steel sheet according to claim 1, wherein the composition includes, expressed in percent by weight, Cr≤0.5%.

7. The steel sheet according to claim 1, wherein the composition includes, expressed in percent by weight, Nb≤0.05%.

8. The steel sheet according to claim 2, wherein the microstructure includes a maximum of 30% ferrite.

9. The steel sheet according to claim 1, wherein a total elongation is greater than 14%.

10. The steel sheet according to claim 1, further comprising a zinc or zinc alloy coating.

11. An automobile part comprising:
a cold-rolled and annealed steel sheet according to claim 1 formed into a part.

12. A cold-rolled and annealed steel sheet with mechanical strength greater than or equal to 900 MPa, an elastic limit greater than 700 MPa and uniform elongation greater than or equal to 12%, the composition of which comprises, expressed in percent by weight:

0.26%≤C≤0.45%;

1.0%≤Mn≤3.0%;

1.0%≤Si≤3.0%;

Al≤0.1%;

Cr≤1.5%;

S≤0.005%;

P≤0.020%;

Nb≤0.1%;

Ti≤0.02%;

V≤0.015%; and

N≤0.01%;

a balance of the composition consisting of iron and unavoidable impurities resulting from processing;

256$x$C+47$x$Mn+150$x$Cr+2260$x$Nb>142; and a microstructure of the steel sheet including, in area percentages:
from 13 to 25% residual austenite; and
from 13 to 30% islands of residual austenite and martensite;
a balance of the microstructure consisting of bainite or bainite and ferrite, the bainite being formed at a temperature from 360 to 440 degrees C.

13. The cold-rolled and anneal steel sheet according to claim 12, wherein the balance of the microstructures consists of bainite.

14. The cold-rolled and anneal steel sheet according to claim 12, wherein the bainite is formed at a temperature from 360 to 440 degrees C.

15. The cold-rolled and anneal steel sheet according to claim 12, wherein the bainite is upper bainite and does not include carbides.

16. The steel sheet according to claim 1, wherein the bainite is upper bainite and does not include carbides.

* * * * *